United States Patent
Amarilio et al.

(10) Patent No.: US 10,540,495 B2
(45) Date of Patent: Jan. 21, 2020

(54) USB-C USAGE INDICATION

(71) Applicant: Google Inc., Mountain View, CA (US)

(72) Inventors: Omri Amarilio, Palo Alto, CA (US); Katie Leah Roberts-Hoffman, San Jose, CA (US); Alexander Friedrich Kuscher, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 128 days.

(21) Appl. No.: 15/622,302

(22) Filed: Jun. 14, 2017

(65) Prior Publication Data

US 2017/0357803 A1   Dec. 14, 2017

Related U.S. Application Data

(60) Provisional application No. 62/349,901, filed on Jun. 14, 2016.

(51) Int. Cl.

| | | |
|---|---|---|
| *G06F 21/55* | (2013.01) | |
| *G06F 1/28* | (2006.01) | |
| *G06F 13/40* | (2006.01) | |
| *G06F 13/42* | (2006.01) | |
| *G06F 21/85* | (2013.01) | |

(52) U.S. Cl.
CPC .............. *G06F 21/552* (2013.01); *G06F 1/28* (2013.01); *G06F 13/4068* (2013.01); *G06F 13/4282* (2013.01); *G06F 21/85* (2013.01); *G06F 2213/0042* (2013.01); *G06F 2221/034* (2013.01)

(58) Field of Classification Search
CPC .......... G06F 21/552; G06F 1/26; G06F 1/266; G06F 1/28; G06F 11/325; G06F 13/4068; G06F 13/4282; G06F 21/85; G06F 2213/0042; G06F 2221/034; Y02D 10/14; Y02D 10/151
See application file for complete search history.

(56) References Cited

U.S. PATENT DOCUMENTS

| | | | |
|---|---|---|---|
| 7,019,658 B1 * | 3/2006 | Erickson | .............. H01R 13/641 340/635 |
| 2002/0038394 A1 * | 3/2002 | Liang | ..................... G06F 1/266 710/62 |
| 2004/0071410 A1 | 4/2004 | Ma | |
| 2005/0215108 A1 | 9/2005 | Chen | |

(Continued)

OTHER PUBLICATIONS

International Search Report and Written Opinion for PCT Patent Application No. PCT/US2017/037382, dated Oct. 10, 2017, 15 pages.

*Primary Examiner* — Ayoub Alata
(74) *Attorney, Agent, or Firm* — Brake Hughes Bellermann LLP

(57) ABSTRACT

A method includes establishing a power link between a power source and a computing device using a cable assembly, the cable assembly including at least one indicator, monitoring a status of the power link at the computing device, determining if the status of the power link includes establishing a communication link, and upon determining the status of the power link includes establishing the communication link determining a direction of data flow along the cable assembly associated with the communication link, and generating a signal using the at least one indicator, the signal indicating the direction of data flow along the cable assembly.

15 Claims, 9 Drawing Sheets

(56) References Cited

U.S. PATENT DOCUMENTS

2008/0222692 A1\* 9/2008 Andersson .............. G06F 21/33
  726/1
2009/0109050 A1 4/2009 Sullivan et al.
2014/0156879 A1 6/2014 Wong et al.

\* cited by examiner

USB-C USAGE INDICATION

RELATED APPLICATION

This application claims priority to and the benefit of U.S. Provisional Patent Application No. 62/349,901, filed on Jun. 14, 2016, entitled "USB-C USAGE INDICATION", the contents of which are incorporated in their entirety herein by reference.

FIELD

Implementations relate to providing and using indicators of data/power flow in Universal Serial Bus (USB) applications.

BACKGROUND

Devices using the USB-C standard can include capabilities including charging (either the device or another device), display connectivity (connecting to an external monitor), data transfer and the like. However, it is possible to take advantage of these features maliciously, thus creating a security or privacy risk. For example, connecting a device (e.g., a computer, a tablet, a phone and/or the like) to a public charging station or kiosk, not knowing that the charging station or kiosk may also implement a monitoring process that includes recording information on the device's screen throughout the session can compromise the privacy of a user of the device.

SUMMARY

In a general aspect, a method (and non-transitory computer readable medium implementation thereof) includes establishing a power link between a power source and a computing device using a cable assembly, the cable assembly including at least one indicator, monitoring a status of the power link at the computing device, determining if the status of the power link includes establishing a communication link, and upon determining the status of the power link includes establishing the communication link determining a direction of data flow along the cable assembly associated with the communication link, and generating a signal using the at least one indicator, the signal indicating the direction of data flow along the cable assembly.

Implementations can include one or more of the following features. For example, the method can further include indicating the direction of data flow in a pop-up window on a display of the computing device. The method can further include indicating the direction of data flow with an indicator on the computing device. The method can further include indicating the direction of data flow with an indicator on the computing device when a user is not actively using the computing device. Monitoring the status of the power link can include monitoring data packets communicated via an interface of the computing device that is coupled to the cable assembly. Determining the status of the power link can include counting a number of the data packets and a size of the data packets communicated on the interface. Determining the direction of data flow can include determining if at least one of the number of the data packets or a size of the data packets exceeds a threshold value.

For example, the computing device can include an interface that is coupled to the cable assembly. The interface can include a first contact and a second contact. Determining the status of the power link can include determining whether data is communicated via the first contact or the second contact. The method can further include disabling the at least one indicator in response to data being communicated only via the first contact. Determining the status of the power link can include determining a type of data being communicated. The signal can cause at least one indicator to flash on and off with a color pattern indicating the direction of data flow. The method can further include determining a direction of power flow, and the signal causes at least one indicator to flash on and off with a color pattern indicating the direction of power flow.

In another general aspect, a computing device, includes an interface configured to couple a cable assembly to the computing device to establish a power link between a power source and the computing device using the cable assembly, the cable assembly including at least one indicator, a first controller configured to monitor a status of the power link at the computing device, and a second controller configured to determine if the status of the power link includes establishing a communication link. Upon determining the status of the power link includes establishing the communication link determining a direction of data flow along the cable assembly associated with the communication link, and generating a signal using the at least one indicator, the signal indicating the direction of data flow along the cable assembly.

Implementations can include one or more of the following features. For example, the second controller can be configured to indicate the direction of data flow in a pop-up window on a display of the computing device. The second controller can be configured to indicate the direction of data flow with an indicator on the computing device. The second controller can be configured to indicate the direction of data flow with an indicator on the computing device when a user is not actively using the computing device. Monitoring the status of the power link can include monitoring data packets communicated via an interface of the computing device that is coupled to the cable assembly. Determining the status of the power link can include counting a number of the data packets and a size of the data packets communicated on the interface. Determining the direction of data flow can include determining if at least one of the number of the data packets or a size of the data packets exceeds a threshold value.

For example, the computing device can include an interface that is coupled to the cable assembly. The interface can include a first contact and a second contact. Determining the status of the power link can include determining whether data is communicated via the first contact or the second contact. The method can further include disabling the at least one indicator in response to data being communicated only via the first contact. Determining the status of the power link can include determining a type of data being communicated. The signal can cause at least one indicator to flash on and off with a color pattern indicating the direction of data flow. The method can further include determining a direction of power flow, and the signal causes at least one indicator to flash on and off with a color pattern indicating the direction of power flow.

In still another general aspect, a cable assembly includes a first connector, a second connector, at least one conductor, and at least one indicator configured to receive a signal from a computing device coupled to the cable assembly, the signal indicating a direction of data flow, and indicate the direction of data flow.

Implementations can include one or more of the following features. For example, the at least one indicator can be on at least one of the first connector and the second connector. The at least one indicator can be indirectly attached to the at least one conductor.

BRIEF DESCRIPTION OF THE DRAWINGS

Example implementations are described in the detailed description given herein below and in the accompanying drawings, in which like elements are represented by like reference numerals, which are given by way of illustration only and thus are not limiting of the example implementations.

Figure 1:
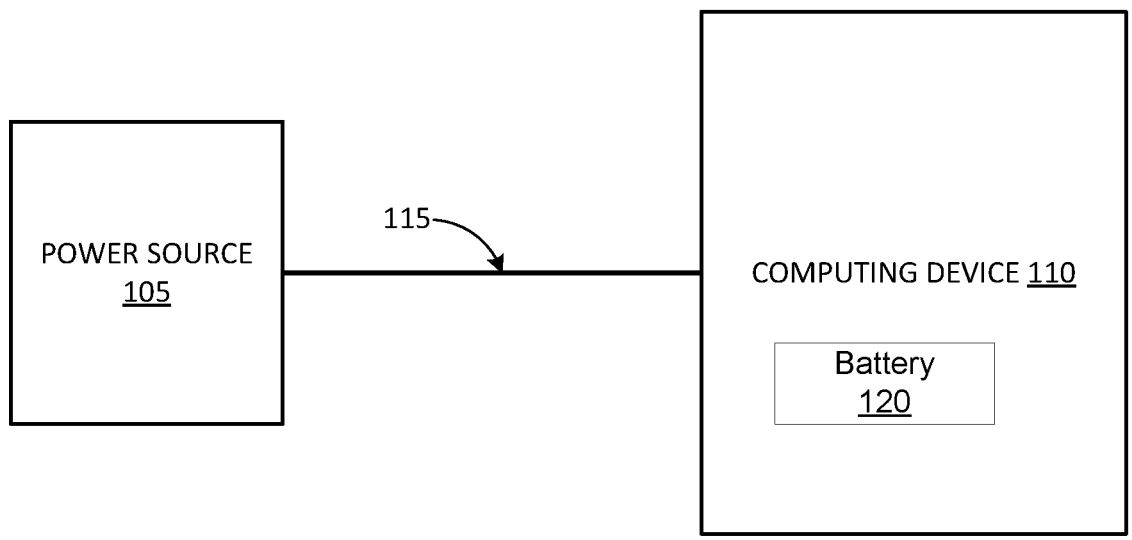
FIGS. 1 and 2 are schematic block diagrams of systems according to at least one example implementation.

The Figures illustrate the general characteristics of methods, structure and/or materials utilized in certain example implementations and to supplement the written description provided below. These drawings are not, however, to scale and may not precisely reflect the precise structural or performance characteristics of any given implementation, and should not be interpreted as defining or limiting the range of values or properties encompassed by example implementations. For example, layers, regions and/or structural elements may be reduced or exaggerated for clarity. The use of similar or identical reference numbers in the various drawings is intended to indicate the presence of a similar or identical element or feature.

DETAILED DESCRIPTION OF THE IMPLEMENTATIONS

While example implementations may include various modifications and alternative forms, implementations are shown by way of example in the drawings. It should be understood, however, that there is no intent to limit example implementations to the particular forms disclosed, but on the contrary, example implementations are to cover all modifications, equivalents, and alternatives. Like numbers refer to like elements throughout the description of the figures.

Figure 2:
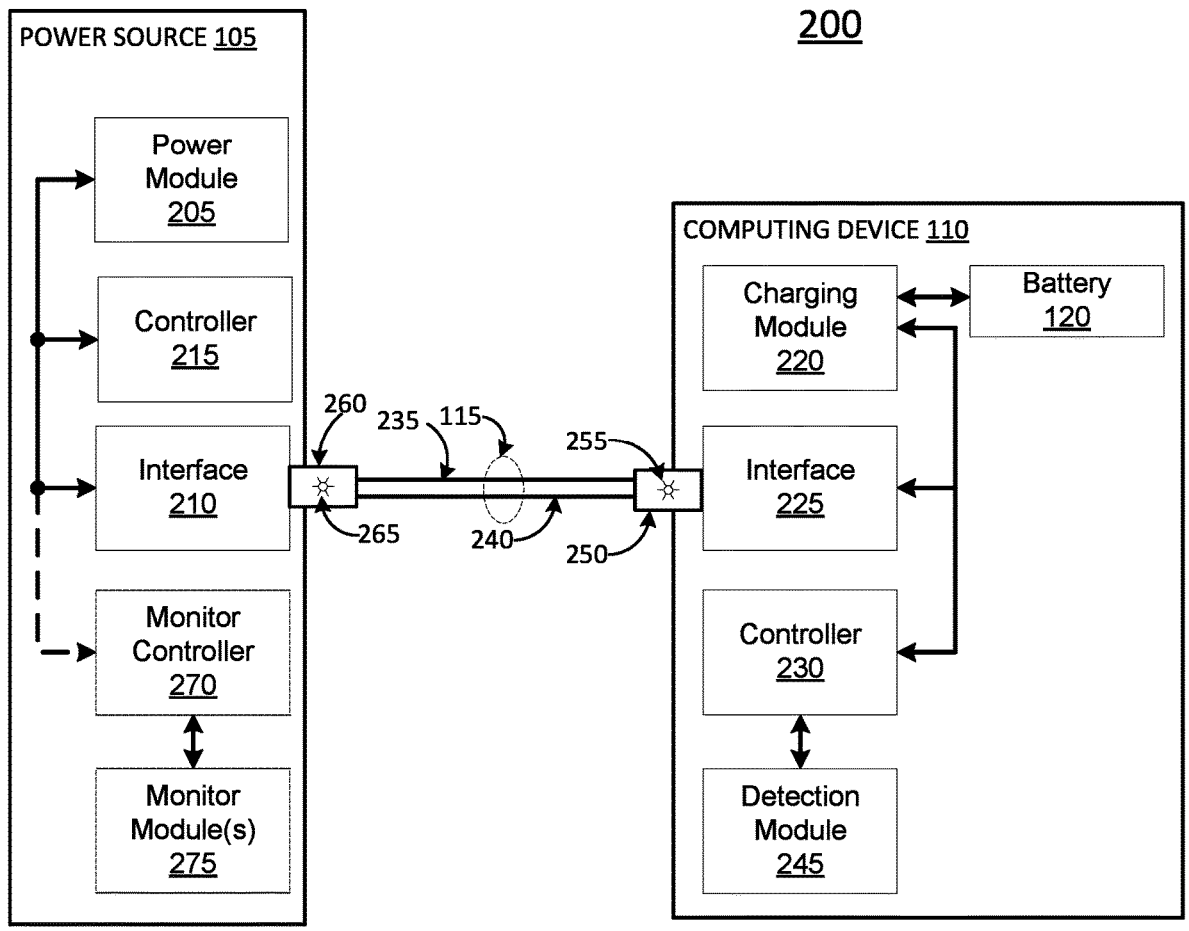

FIGS. 1 and 2 are schematic block diagrams of systems according to at least one example implementation. As shown in FIG. 1, a system 100 includes a power source 105 and a computing device 110. The power source 105 and the computing device 110 are communicatively coupled via a cable 115. The cable 115 is also configured to transfer power from the power source 105 to the computing device 110. The computing device 110 may be configured to charge a battery 120 and/or provide power to the computing device 110 (e.g., to power a CPU, a memory, and the like) using the transferred power. The cable 115 may also be configured to transfer data between the power source 105 and the computing device 110. For example, the power source 105 may be part of a public kiosk configured to provide a data connection (e.g., a connection to the Internet) and power to a connected device. In an alternative implementation, the computing device 110 can be configured to provide power to the power source 105. Accordingly, the power source 105 can consume power received from the computing device 110 and/or transfer the power to another connected device.

As shown in FIG. 2, a system 200 includes the power source 105 (e.g., a public kiosk) and the computing device 110 (e.g., a mobile computer). The power source 105 and the computing device 110 are communicatively coupled via the cable 115. The power source 105 includes a power module 205, an interface 210, and a controller 215. In an example implementation, the power source 105 further includes a monitor controller 270 and a monitor module 275 (shown with dotted to illustrate that the user of computing device 110 is not expecting the existence of these features).

The computing device 110 includes a charging module 220, an interface 225, a controller 230, and the battery 120. In an example implementation, the computing device 110 includes a detection module 245. The detection module 245 may be configured to detect the use of the monitor controller 270 and the monitor module 275. In other words, the detection module 245 may be configured to determine that data and/or power are being communicated from the computing device 110 to the power source 105. For example, the detection module 245 can include an element of a communications controller board (e.g., USB controller) in a computer (e.g., computing device 605). The detection module 245 can include (or be an element of) an application specific integrated circuit (ASIC) and/or a software module configured to use a processor of the controller or the computing device to execute the software code. In an example implementation, the detection module 245 can monitor data (e.g. data packets) communicated via interface 225. The detection module 245 can monitor data by counting a number and a size of packets, detecting communication events, and the like. The detection module 245 can monitor data on some or all of a plurality of contacts (or pins) associated with communicating data via the interface 225. For example, the detection module 245 can monitor data communicated via the Tx contacts (e.g., as shown in serial interface 300) and ignore or not monitor data communicated via the CC (e.g., as shown in serial interface 300) contacts.

The detection module 245 may be further be configured to determine a type of data being communicated. For example, communicating monitor (screen or display) data may be unexpected and/or undesirable whereas battery status data may be expected and/or desirable. Detecting the existence of monitor data and/or power being transmitted from the computing device 110 to the power source 105 may indicate a malicious use of the device by the power source 105. For example, the existence of monitor data and/or power being transmitted from the computing device 110 to the power source 105 may indicate a privacy and/or security threat. However, the existence of battery status data (e.g., percent charge, charge rate, and the like) being transmitted from the computing device 110 to the power source 105 may be expected and acceptable.

In an example implementation, all (or a significant portion of) data transfers from the computing device 110 to the power source 105 are monitored by the detection module 245. The data transfers that are of concern can then be flagged as malicious, and other data can be ignored or not flagged. For example, data related to that which is displayed on a display of the computing device, passwords, user-specific data, and the like can be flagged as malicious or of concern, whereas data related to battery status or state can be ignored or not flagged as of concern.

In another example implementation, pins or contacts associated with interface 225 that can be used for data transfer generally can be monitored whereas pins or contacts associated with interface 225 that can be used for battery data transfer or battery communications may not be monitored.

The cable 115 can be configured communicate signals and or transfer power between the power source 105 and the computing device 110. In the illustrated implementation, the cable 115 includes at least one cable 235 (e.g., wire(s) and/or conductor(s)) configured to transfer power from the power source 105 to the computing device 110 and at least one cable 240 (e.g., wire(s) and/or conductor(s)) configured to carry communication signals between the power source 105 and the computing device 110. However, in another example implementation, one cable (e.g., wire(s) and/or conductor(s)) can be used to both carry communication signals and to transfer power. The cable 115, including the at least one cable 235 and the at least one cable 240, can be communicatively coupled to (e.g., between) the interface 210 and the interface 225. In some implementations, the cables 235 and 240 are one and the same. The cable 115 can also include connectors 250 and 260. The connectors 250, 260 can include indicators 255 and 265. The connectors 250, 260 can be configured to provide a physical connection from the cable 115 to the power source 105 and the computing device 110. The indicators 255, 265 can be configured to provide an indication that data is being communicated based on a determination by the detection module 245. In other words, the indicators 255, 265 can be configured to receive a signal from the detection module 245 (e.g., via the controller 230 and the interface 225) and display an indication that data is being transferred and/or that power is being transferred out of the computing device 110. The indicators 255, 265 can be configured to indicate a direction of data flow (e.g., using an arrow, a color scheme, an on/off scheme and the like). The indicators 255, 265 can be visible indicators. For example, the indicators 255, 265 can be visible to a user of the relevant apparatus, such as lights, for example, being provided by one or more (light emitting diode (LED).

The power module 205 may be configured to convert AC to DC and to transform a voltage associated with a wall outlet to a voltage associated with the computing device 110. Converting AC to DC and transforming the voltage associated with the wall outlet can include use of a transformer (not shown). The voltage can be a varying voltage (e.g., between 2.5V and 7.5V, between 5V and 20V, and the like).

The interface 210 may be configured to attach or couple the cable 115 (or a connector of the cable 115) to the power source 105 in order to facilitate communications between the power source 105 and the computing device 110. The interface 210 may be configured to receive communications from the computing device 110 via the at least one cable 240 of the cable 115. The interface 210 may be configured to communicate the communications to the controller 215). The interface 210 may be configured to transfer DC power from the power source 105 to the computing device 110 via at least one cable 235 of the cable 115. The cable 115 may include a plurality of cables and/or wires configured for one or more of power transfer (e.g., bus voltage and ground cables) or communicating data (e.g., serial data and/or configuration data).

In one example implementation, the interface 210 may be configured to receive communications from the computing device 110 using a serial protocol (e.g., USB 3.0, USB 3.1 and the like). In this example implementation, the interface 210 may be configured as a conduit for sending/receiving serial communications (e.g., using a serial protocol). For example, the interface 210 may be a Universal Serial Bus (USB) connector (e.g., USB 1.0, USB 2.0, USB 3.0, micro-USB, mini-USB, USB type-C and the like).

In another example implementation, the interface 210 may be configured to receive communications from the computing device 110 using a Biphase Mark Coding (BMC) scheme. An example BMC scheme can define digital values (e.g., a '1' or a '0') based on a time interval between a line voltage high value and a line voltage low value. The BMC scheme can also define a beginning and/or an ending of a message. The BMC standard can be associated with configuring USB power delivery. Accordingly, messages based on the BMC standard can communicated over at least one of the plurality of cables and/or wires associated with the cable 115. For example, messages based on the BMC standard can communicated over via the at least one cable 240.

The controller 215 may be configured to send/receive information or data associated with powering the computer device 110 via the at least one cable 240 and the interface 210. The information can include a desired voltage, current and/or power setting, a communication time interval and/or the like. The controller 215 may be further configured to send/receive data associated with, for example, Internet traffic, content, applications and/or the like via the at least one cable 240 and the interface 210.

The charging module 220 may be configured to charge battery 120 using power received from the power source 105 via the at least one cable 235 of the cable 115. The charging module 220 may be configured to monitor a status of the battery 120. For example, the charging module 220 may measure a voltage, a current, a temperature and the like of the battery.

The interface 225 may be configured to attach or couple the cable 115 (e.g., using the connector 250 of the cable 115) to the computing device 110 in order to facilitate communications between the power source 105 and the computing device 110. The interface 225 may be configured to send/receive communications from the computing device 110 via the at least one cable 240 of the cable 115. The interface 225 may be configured to communicate the communications to the controller 230. The interface 225 may be configured as a conduit for sending/receiving serial communications (e.g., using a serial protocol). For example, the interface 210 may be a Universal Serial Bus (USB) connector (e.g., USB 1.0, USB 2.0, USB 3.0, micro-USB, mini-USB, type-C USB and the like). The interface 225 may be configured to receive DC power from the power source 105 via the at least one cable 235 of the cable 115 in order to charge the battery 120.

The controller 230 may be configured to communicate a desired voltage, current and/or power setting, a communication time interval and/or the like. The desired voltage, current and/or power setting may be based on an amount of power desired to charge a battery 120 and/or provide power to the computing device 110 (e.g., to power a CPU, a memory, and the like).

The detection module 245 may be configured to monitor and/or detect data and/or power communicated from the computing device 110 to the power source 105. The detection module 245 may include one or more algorithms, implemented as computer executed code, configured to detect data and/or power communicated from the computing device 110 to the power source 105. The one or more algorithms can be based on, for example, direction of data flow, type of data flow, quantity of data flow, content of the data, how the data flow was initiated, and/or the like. The one or more algorithms can use input data received from and/or generated in the interface 225 and/or controller 230.

In another implementation, the detection module 245 and elements of controller 230 can be included in at least one of connector 250, 260. For example, the detection module 245 and elements of controller 230 could be an ASIC on a board of at least one of connector 250, 260. Accordingly, the examples and implementations described herein could be implemented without any additions to computing device 110. Further, computing device 110 could be in a reduced power or standby mode and implement the described innovations without use of computing resources of the computing device 110. In other words, cable 115 (e.g., as a cable assembly) could include the necessary hardware and software to implement the techniques described in this disclosure.

Figure 3:
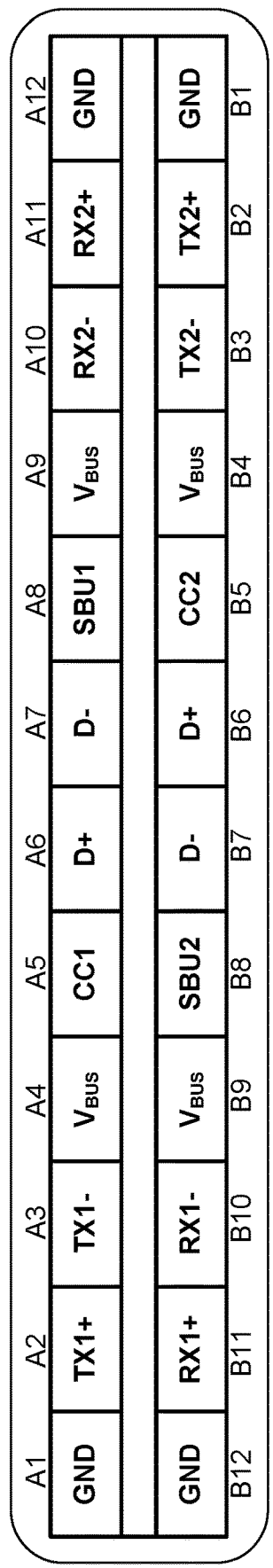
FIG. 3 is a block diagram illustrating a structure of serial interface according to at least one example implementation.

FIG. 3 is a block diagram illustrating a structure of serial interface according to at least one example implementation. As shown in FIG. 3, the serial interface 300 can include a plurality of contacts (or pins) A1 to A12 and B1 to B12. Contact A1, A12, B1 and B12 can be ground contacts. Contacts A2 and A3 (TX1+, TX1−), B2 and B3 (TX1+, TX1−) can form differential pairs in a high speed transmission (TX or transmit end) line or path. Contacts A10 and A11 (RX2−, RX2+), B10 and B11 (RX1−, RX1+) can form differential pairs in a high speed transmission (RX or receive end) line or path. Contacts A4, A9, B4 and B9 can be bus power ($V_{BUS}$) contacts. Contacts A5 and B5 (CC1, CC2) can form a configuration channel, a control channel and/or a control path. Contacts A6, A7, B6 and B7 (D+, D−) can form a differential pair in a transmission line or path. Contacts A8 and B8 can form a channel as a side band use (SBU). As shown in FIG. 3, the serial interface 300 can further include an outer body or shell 305. The outer body or shell 305 can be configured to help hold a mated pair of interfaces. Further, in a receptacle (jack or female) interface, element 310 can include a void in which a plug (or male) interface can be inserted. In another implementation of a plug (or male) interface, element 310 can include a printed circuit board on which the contacts are formed which can be configured to be inserted into a corresponding receptacle.

In an example implementation, the data paths associated with contacts A6, A7, B6 and B7 (D+, D−), contacts A2 and A3 (TX1+, TX1−), B2 and B3 (TX1+, TX1−), and contacts A10 and A11 (RX2−, RX2+), B10 and B11 (RX1−, RX1+) can be associated with the serial protocol of the serial interface 300 (e.g., USB 3.0, USB 3.1, and/or the like). Accordingly, controller 230 can sense or measure a voltage associated with contacts A6, A7, B6 and B7 (D+, D−), contacts A2 and A3 (TX1+, TX1−), B2 and B3 (TX1+, TX1−), and/or contacts A10 and A11 (RX2−, RX2+), B10 and B11 (RX1−, RX1+) of interface 225. The one or more algorithms can use this sensed or measured voltage as inputs to determine if there is an unexpected dataflow from the computing device 110 to the power source 105.

Figure 4:
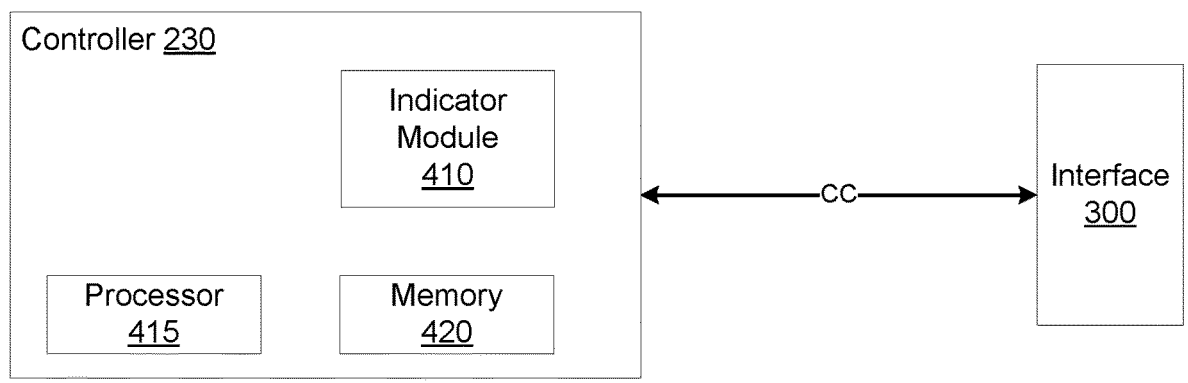
FIG. 4 is a schematic block diagram of a controller according to at least one example implementation.

FIG. 4 is a schematic block diagram of a controller according to at least one example implementation. As shown in FIG. 4, the controller 230 (of the computing device 110) includes an indicator module 410, a processor 415 and a memory 420. The indicator module 410 can be configured to generate a signal configured to cause at least one light to turn on, cause a pop-up window to be presented on a computer display, cause an indicator on a computer and/or computer display to turn on, and the like. In other words, the indicator module 410 can be configured to generate a signal configured to cause an indicator to indicate a direction of data flow and/or a direction of power flow. For example, the indicator module 410 can be configured to generate a signal based on data collected by the detection module 245. Although not shown as such, the detection module 245 could be embodied as an element of the controller 230.

As shown in FIG. 4, the controller 230 can be coupled to the interface 300 via path CC. However, in an alternate implementation, SBU1/SBU2, paths TX1/TX2 and RX1/RX2 and/or path $V_{BUS}$ (e.g., as a high frequency signal) can be used. Accordingly, communications within the computing device 110 and between the controller 230 and the interface 300 can be communicated via the CC path. For example, should the aforementioned indicator be included as an element of the interface 300 or on the cable 115 (e.g., as indicators 255 and 265), the signal configured to cause an indicator to indicate a direction of data flow and/or a direction of power flow can be communicated from the indicator module 410 to the interface 300 via path CC. Further, in an alternate implementation, communications between the computing device 110 and between the controller 230 and the interface 300 can be communicated via one of the SBU1/SBU2, TX1/TX2 and RX1/RX2 and/or $V_{BUS}$ paths.

The processor 415 may be configured to execute instructions. For example, processor 415 can be associated with any of the components of the controller 230, and can be used for execution of any of the operations of the controller 230. The memory 420 may be configured to store instructions (e.g., as code segments) and/or data associated with implementing functions associated with the controller 230 and/or the computing device 110.

As may be appreciated, the processor (or at least one processor) 415 may be formed on a substrate and may be utilized to execute instructions stored on the memory (or at least one memory) 420, so as to thereby implement the various features and functions described herein, or additional or alternative features and functions. Of course, the processor 415 and the memory 420 may be utilized for various other purposes. In particular, it may be appreciated that the memory 420 may be understood to represent an example of various types of memory and related hardware and software which might be used to implement any one of the modules described herein. Systems and/or methods described above and/or below may include data and/or storage elements. The data and/or storage elements (e.g., data base tables) may be stored in, for example, the memory 420.

The memory 420 can store information within the computing device 110. In one implementation, the memory 420 is a volatile memory unit or units. In another implementation, the memory 420 is a non-volatile memory unit or units. The memory 420 may also be another form of computer-readable medium, such as a magnetic or optical disk. The memory 420 may be a non-transitory computer readable medium.

Figure 5A:
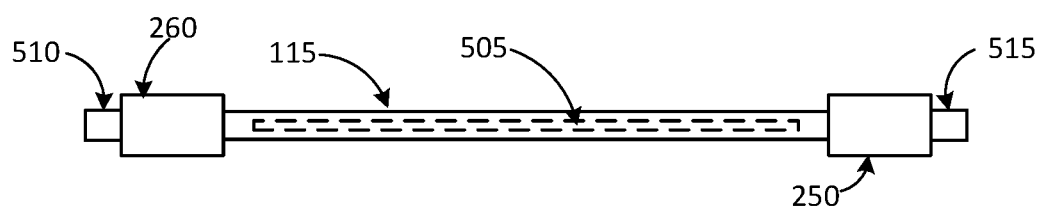
FIGS. 5A and 5B are block diagrams of a cable assembly according to at least one example implementation.
Figure 5B:
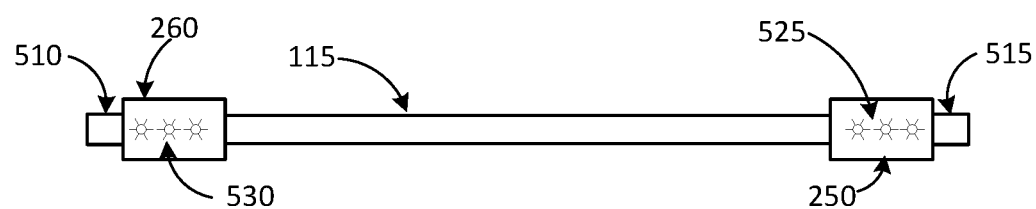

FIGS. 5A and 5B are block diagrams of a cable assembly according to at least one example implementation. As shown in FIG. 5A, the cable assembly 500-1 includes the cable 115, the connectors 250, 260, plugs 510, 515 and indicator 505. Plugs 510, 515 can be configured to mechanically insert into interface 300. Indicator 505 can be configured to indicate a direction of data flow and/or a direction of power flow. For example, the indicator 505 can include a string of LED lights configured to flash on and off indicating a direction of data flow and/or a direction of power flow. The cable 115 can be constructed of at least one conductor configured to communicate data and/or transfer power between devices. The cable 115 can be constructed with the indicator 505 under a transparent or semi-transparent jacket or covering.

As shown in FIG. 5B, the cable assembly 500-2 includes the cable 115, the connectors 250, 260 and plugs 510, 515. The connectors 250, 260 include indicators 525 and 530. Indicators 525, 530 can be configured to indicate a direction of data flow and/or a direction of power flow. For example, the indicators 525, 530 can include at least one LED light configured to flash on and off and/or with a color pattern indicating a direction of data flow and/or a direction of power flow. The implementations shown in FIGS. 5A and 5B and described herein are just a few examples. Other implementations are within the scope of this disclosure.

Figure 6A:
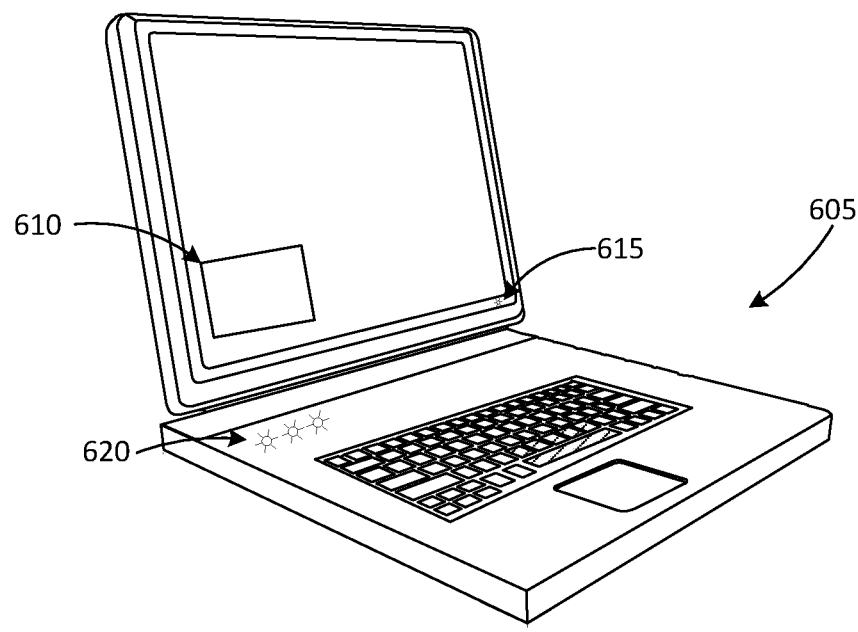
FIGS. 6A and 6B are block diagrams of a computer device according to at least one example implementation.
Figure 6B:
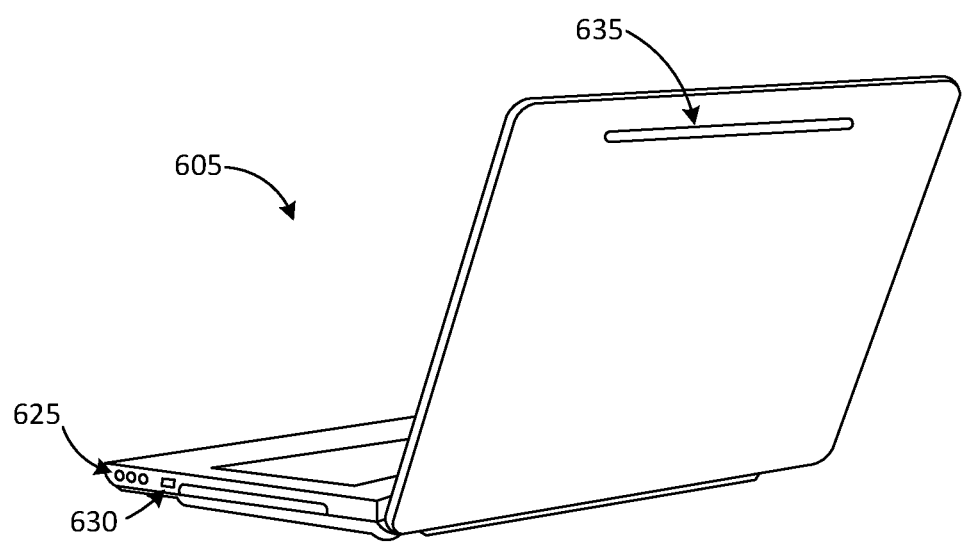

FIGS. 6A and 6B are block diagrams of a computer device according to at least one example implementation. As shown in FIG. 6A, the computer device 605 can include a pop-up window 610 (shown on the display of the computer device 605) and an indicator 615 (also shown on the display of the computer device 605). The pop-up window 610 can be displayed upon determining a direction of data flow and/or a direction of power flow is undesirable, possibly malicious and/or not as expected. The indicator 615 can be displayed and/or change status (e.g., on/off, green/red and/or the like) upon determining a direction of data flow and/or a direction of power flow is undesirable, possibly malicious and/or not as expected. The pop-up window 610 and the indicator 615 can include elements of an operating system executing on the computer device 605.

As shown in FIG. 6A, the computer device 605 can include at least one indicator light 620. The at least one indicator light 620 can be configured to indicate a direction of data flow and/or a direction of power flow that is undesirable, possibly malicious and/or not as expected. The at least one indicator light 620 can be incorporated into a body or shell of the computer device 605. The at least one indicator light 620 can be on a same hardware (within the computer device 605) as a hardware including the interface 300.

As shown in FIG. 6B, the computer device 605 can include at least one indicator light 625 and interface 630. The at least one indicator light 625 can be configured to indicate a direction of data flow and/or a direction of power flow that is undesirable, possibly malicious and/or not as expected. The at least one indicator light 625 can be incorporated into a body or shell of the computer device 605. The at least one indicator light 625 can be on a same hardware (within the computer device 605) as a hardware including the interface 630. The interface 630 can include an element of and/or associated with the interface 300.

As shown in FIG. 6B, the computer device 605 can include at least one indicator light 635. The at least one indicator light 635 can be configured to indicate a direction of data flow and/or a direction of power flow that is undesirable, possibly malicious and/or not as expected. The at least one indicator light 635 can be incorporated into a body or shell of the computer device 605. The at least one indicator light 635 can be positioned, on the computer device 605, such that the at least one indicator light 635 can be observed when a user is not actively using the computer device 605 and/or when the computer device 605 is not in use (e.g., when a laptop is closed while the battery is being charged). The example implementations described with regard to FIGS. 6A and 6B can be used singularly and/or in combination.

Figure 7:
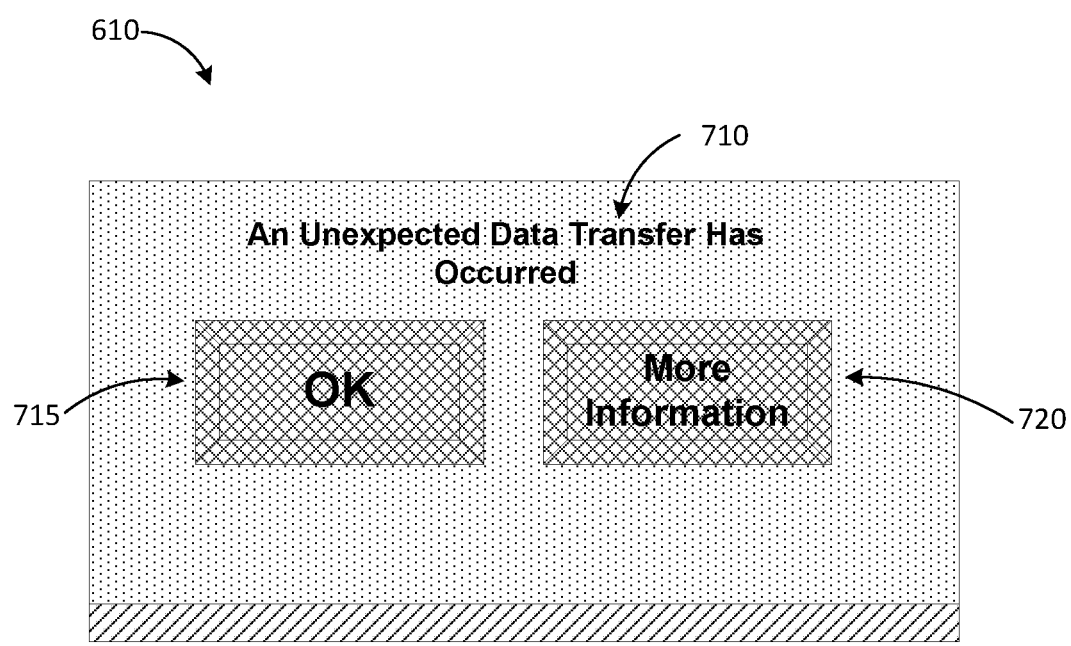
FIG. 7 is a block diagram of a pop-up window according to at least one example implementation.

FIG. 7 is a block diagram of a pop-up window according to at least one example implementation. As shown in FIG. the pop-up window 610 can include a descriptive label 710, a first button 715 and a second button 720. The descriptive label can include text that describes the purpose of the pop-up window 610. The first button 715 can allow a user to acknowledge the pop-up window 610 and may close the pop-up window 610. The second button 720 can be configured to open a second window (not shown) configured to provide additional information related to the purpose of the pop-up window 610. For example, the additional information can include information associated with the data flow and/or power flow, a program causing the causing the data flow and/or a power flow and the like.

Figure 8:
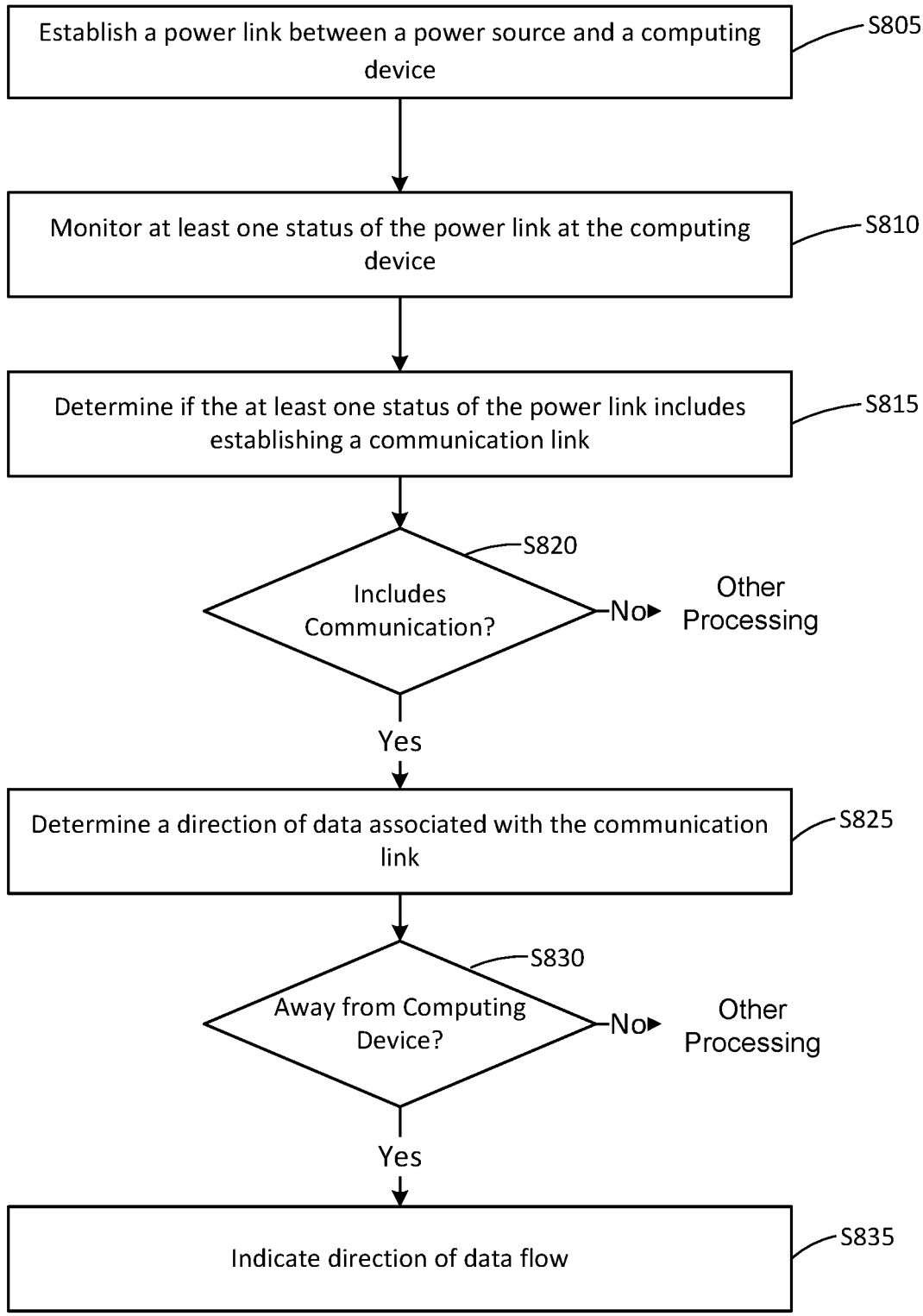
FIG. 8 is a flowchart of a method according to at least one example implementation.

FIG. 8 is a flowchart of a method according to example implementations. The steps described with regard to FIG. 8 may be performed due to the execution of software code stored in a memory (e.g., at least one memory 420) associated with an apparatus (e.g., as shown in FIGS. 1, 2 and 4) and executed by at least one processor (e.g., at least one processor 415) associated with the apparatus. However, alternative implementations are contemplated such as a system embodied as a special purpose processor. Although the steps described below are described as being executed by a processor, the steps are not necessarily executed by a same processor. In other words, at least one processor may execute the steps described below with regard to FIG. 8.

As shown in FIG. 8, in step S805 a power link is established between a power source and a computing device. For example, a user of the computer device 110 can plug one end of cable 115 into a public power kiosk as power source 105 and the other end of cable 115 into computing device 110. In an example implementation, the power link can be established using the $V_{BUS}$ contact or path of interface 300.

In step S810 at least one status of the power link is monitored at the computing device. For example, detection module 245 can monitor the status of the power link. Detection module 245 can monitor the status as direction of power flow (e.g., battery 120 charge/discharge), data flow through the interface 225, status of voltages on contacts (e.g., A5, B5, CC1, CC2, SBU1, SBU2, TX1, TX2, RX1, RX2 and the like) of interface 300, message communications via contacts A5, B5, CC1, and/or CC2, and/or the like. For example, a voltage above a charging threshold (e.g., 100 v) on the $V_{BUS}$ contact in addition to a message communications via contacts CC1 and/or CC2 can indicate a power link has been established. Data (e.g., a number of bits) above a threshold value (e.g., bits/sec, bits/min, and the like) transmitted on CC1 (e.g., CC2 can be used to acknowledge data transmissions) can indicate power flow from the power source 105 to the computing device 110.

In some example implementations, data communicated via contacts CC1 and/or CC2 can be considered safe because the data can be considered as related to battery and/or battery charging status. However, if the battery is discharging when the battery should be charging, contacts CC1 and/or CC2 can be monitored to determine a direction of power flow. For example, if CC2 is typically used to acknowledge (ACK) messages, but instead is used to send messages, power can be determined to be transmitted from the computing device 110 to the power source 105. Further, data (e.g., as data packets) transmitted via the TX1 and TX2 contacts can be monitored when the computing device 110 is being charged by the power source 105 to determine a direction of at least one message. In other words, monitoring the status of the power link can include monitoring data packets and/or a direction of data flow via interface 300.

In step S815, it is determined whether the at least one status of the power link includes establishing a communication link. For example, a serial communications link can be established (e.g., maliciously established) between the computing device 110 and the power source 105. In an example implementation, the serial communications link can be established using serial interface 300. For example, the serial communications link can be established using a serial protocol (e.g., USB 3.0, 3.1 and the like) between the computing device 110 and the power source 105 via the SBU1/SBU2 path, the TX1/TX2 and/or RX1/RX2 path.

In an example implementation, data (e.g., as data packets) transmitted via the TX1 and TX2 contacts from the computing device 110 to the power source 105 when the computing device 110 is being charged by the power source 105 can be of concern. Accordingly, if a threshold quantity of data (e.g., as bits or voltage changes associated with data packets) are detected, then the status of the power link can be indicated as having been established as a communications link. Establishment of the communication link can indicate a change in status of the power link (e.g., from just a power link to both a power link and a communication link). If the status of the power link does not include establishing a communication link, ("No" in step S820) some other processing is performed. Otherwise ("Yes" in step S820), processing continues to step S825.

In step S825 a direction of data associated with the communication link is determined. For example, the detection module 245 could measure transmissions via the TX1/TX2 path or contacts of the interface 300 on the computing device 110. Communications across the TX1/TX2 can indicate data flow from the computing device 110 to the power source 105. For example, contact TX1/TX2 can be used to transmit data at a device (e.g., computing device 110) and contact RX1/RX2 can be used to receive data at a device (e.g., computing device 110). A data packet of concern can have a number of bits above a threshold number of bits. The threshold number of bits can be based on an acknowledge (ACK) packet. For example, an acknowledge (ACK) packet can have relatively few bits as compared to a packet including data of concern. Therefore, if transmission over TX1/TX2 includes data above the threshold number of bits, the transmission can be flagged as of concern. If a number of transmissions are flagged as of concern in a threshold amount of time (e.g., seconds, minutes and the like) the direction of data flow can be determined as from the computing device 110 to the power source 105. If there is no data flow or the direction of data flow is from the power source to the computing device, ("No" in step S830) some other processing is performed. Otherwise ("Yes" in step S830), processing continues to step S835.

In step S835 a direction of data flow is indicated. For example, the indicators 255, 265 can be configured to receive a signal from the detection module 245 (e.g., via the controller 230 and the interface 225) and display an indication that data is being transferred and/or that power is being transferred out of the computing device 110. The indicators 255, 265 can be configured to indicate a direction of data flow (e.g., using an arrow, a color scheme, an on/off scheme and the like).

For example, the indicator 505 can be configured to receive a signal from the detection module 245 (e.g., via the controller 230 and the interface 225) and indicate a direction of data flow and/or a direction of power flow. For example, the indicator 505 can be a string of LED lights configured to flash on and off indicating a direction of data flow and/or a direction of power flow. For example, the indicators 525, 530 can be configured to receive a signal from the detection module 245 (e.g., via the controller 230 and the interface 225) and indicate a direction of data flow and/or a direction of power flow. For example, the indicators 525, 530 can be at least one LED light configured to flash on and off and/or with a color pattern indicating a direction of data flow and/or a direction of power flow.

For example, the detection module 245 can cause the pop-up window 610 to be displayed upon determining a direction of data flow and/or a direction of power flow is undesirable, possibly malicious and/or not as expected. For example, the detection module 245 can cause the indicator 615, 620, 625 and/or the indicator 635 to be displayed and/or change status (e.g., on/off, green/red and/or the like) upon determining a direction of data flow and/or a direction of power flow is undesirable, possibly malicious and/or not as expected.

According to an example implementation, the method described above with regard to FIG. 8 can be disabled. For example, a user of the computing device 110 can identify safe connections. A safe connection can be two devices (e.g., a cell phone is connected to a desktop) used to upload or exchange files (e.g., photos) from one device to another. A safe connection can be using a private (as opposed to a public kiosk) to charge computing device 110. A safe connection can be the use of the users power source (e.g., a power brick) on a public or private outlet.

Figure 9:
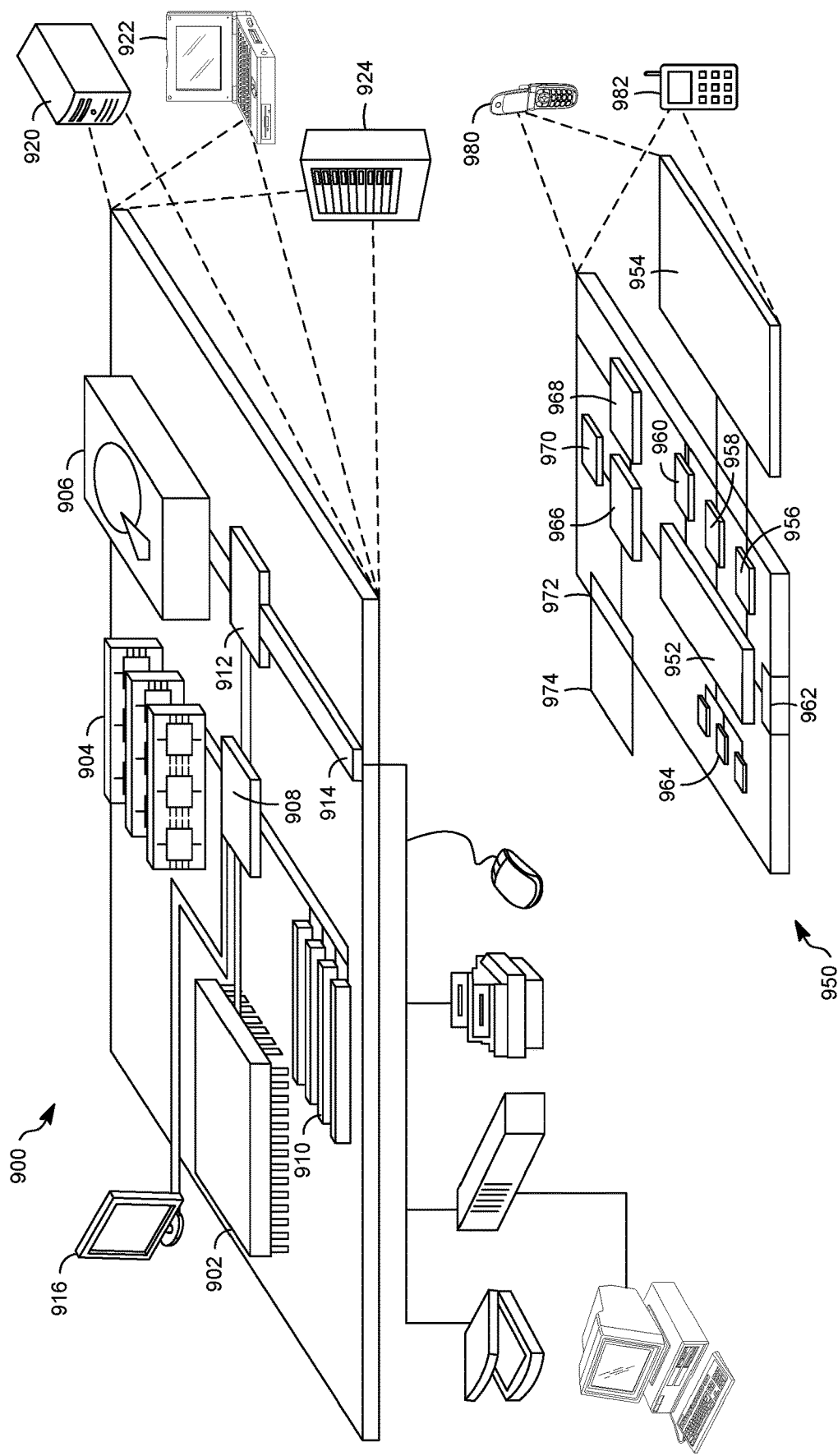
FIG. 9 shows an example of a computer device and a mobile computer device according to at least one example implementation.

FIG. 9 shows an example of a computer device 900 and a mobile computer device 950, which may be used with the techniques described here. Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDM92000, or GPRS, among others. Such communication may occur, for example, through radio-frequency transceiver 968. In addition, short-range communication may occur, such as using a Bluetooth, Wi-Fi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. Various implementations of the systems and techniques described here can be realized as and/or generally be referred to herein as a circuit, a module, a block, or a system that can combine software and hardware aspects. For example, a module may include the functions/acts/computer program instructions executing on a processor (e.g., a processor formed on a silicon substrate, a GaAs substrate, and the like) or some other programmable data processing apparatus.

Some of the above example implementations are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example implementations. Example implementations, however, be embodied in many alternate forms and should not be construed as limited to only the implementations set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example implementations. As used herein, the term and/or includes any and all combinations of one or more of the associated listed items.

It will be understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular implementations only and is not intended to be limiting of example implementations. As used herein, the singular forms a, an, and the are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example implementations belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example implementations and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative implementations, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example implementations are typically encoded on some form of non-transitory program storage medium or implemented over some type of transmission medium. The program storage medium may be magnetic (e.g., a floppy disk or a hard drive) or optical (e.g., a compact disk read only memory, or CD ROM), and may be read only or random access. Similarly, the transmission medium may be twisted wire pairs, coaxial cable, optical fiber, or some other suitable transmission medium known to the art. The example implementations not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or implementations herein disclosed irrespective of whether or not that particular combination has been specifically enumerated in the accompanying claims at this time.

What is claimed is:

1. A method comprising:
    establishing a power link between a power source and a computing device using a cable assembly, the cable assembly including at least one indicator;
    monitoring a status of the power link at the computing device wherein monitoring the status of the power link includes monitoring data packets communicated via an interface of the computing device that is coupled to the cable assembly;
    determining if the status of the power link includes establishing a communication link based on a threshold quantity of data that is transmitted over the cable assembly, wherein determining the status of the power link includes counting a number of the data packets and a size of the data packets communicated on the interface; and
    upon determining the status of the power link includes establishing the communication link:
        determining a direction of data flow along the cable assembly associated with the communication link wherein determining the direction of data flow includes determining if at least one of the number of the data packets or a size of the data packets exceeds the threshold-number of bits, and
        generating a signal using the at least one indicator, the signal indicating the direction of data flow along the cable assembly.

2. The method of claim 1, further comprising indicating the direction of data flow in a pop-up window on a display of the computing device.

3. The method of claim 1, further comprising indicating the direction of data flow with an indicator on the computing device.

4. The method of claim 1, further comprising indicating the direction of data flow with an indicator on the computing device when a user is not actively using the computing device.

5. The method of claim 1,
    wherein the computing device includes an interface that is coupled to the cable assembly,
    wherein the interface includes a first contact and a second contact, and
    wherein determining the status of the power link includes determining whether data is communicated via the first contact or the second contact, the method further comprising:
        disabling the at least one indicator in response to data being communicated only via the first contact.

6. The method of claim 1, wherein determining the status of the power link includes determining a type of data being communicated.

7. The method of claim 1, wherein the signal causes at least one indicator to flash on and off with a color pattern indicating the direction of data flow.

8. The method of claim 1, further comprising determining a direction of power flow, wherein the signal causes at least one indicator to flash on and off with a color pattern indicating the direction of power flow.

9. A computing device, comprising:
    an interface configured to couple a cable assembly to the computing device to establish a power link between a power source and the computing device using the cable assembly, the cable assembly including at least one indicator;
    a first controller configured to monitor a status of the power link at the computing device, wherein monitoring the status of the power link includes monitoring data packets communicated via an interface of the computing device that is coupled to the cable assembly; and
    a second controller configured to determine if the status of the power link includes establishing a communication link based on a threshold quantity of data that is transmitted over the cable assembly, wherein determining the status of the power link includes counting a number of the data packets and a size of the data packets communicated on the interface, and
        upon determining the status of the power link includes establishing the communication link:
            determining a direction of data flow along the cable assembly associated with the communication link wherein determining the direction of data flow includes determining if at least one of the number of the data packets or a size of the data packets exceeds the threshold number of bits, and
            generating a signal using the at least one indicator, the signal indicating the direction of data flow along the cable assembly.

10. The computing device of claim 9, wherein the second controller is further configured to indicate the direction of data flow in a pop-up window on a display of the computing device.

11. The computing device of claim 9, wherein the second controller is further configured to indicate the direction of data flow with an indicator on the computing device.

12. The computing device of claim 9, wherein the second controller is further configured to indicate the direction of data flow with an indicator on the computing device when a user is not actively using the computing device.

13. The computing device of claim 9,
    wherein the interface includes a first contact and a second contact,
    wherein determining the status of the power link includes determining whether data is communicated via the first contact or the second contact, and
    wherein the second controller is further configured to disable the at least one indicator in response to data being communicated only via the first contact.

14. The computing device of claim 9, wherein determining the status of the power link includes determining a type of data being communicated.

15. The computing device of claim 9, wherein the signal causes at least one indicator to flash on and off with a color pattern indicating the direction of data flow.

\* \* \* \* \*